(12) United States Patent
Jacobsen

(10) Patent No.: US 12,416,292 B2
(45) Date of Patent: Sep. 16, 2025

(54) WIND TURBINE OFFSET PITCH DRIVE PINION

(71) Applicant: Inventus Holdings, LLC, Juno Beach, FL (US)

(72) Inventor: Eric M. Jacobsen, Jensen Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 18/524,163

(22) Filed: Nov. 30, 2023

(65) Prior Publication Data
US 2025/0179995 A1 Jun. 5, 2025

(51) Int. Cl.
*F03D 80/50* (2016.01)
*F03D 15/10* (2016.01)
*F03D 80/70* (2016.01)

(52) U.S. Cl.
CPC ........... *F03D 80/504* (2023.08); *F03D 15/10* (2016.05); *F03D 80/701* (2023.08); *F05B 2260/40311* (2013.01)

(58) Field of Classification Search
CPC ...... F03D 80/504; F03D 80/701; F03D 15/10; F05B 2260/40311
See application file for complete search history.

(56) References Cited

U.S. PATENT DOCUMENTS

| | | | |
|---|---|---|---|
| 6,446,524 B1 * | 9/2002 | Gravouia | F16H 57/02004 81/57.33 |
| 8,287,238 B2 | 10/2012 | Dimascio et al. | |
| 8,696,314 B2 | 4/2014 | Mashue et al. | |
| 9,140,232 B2 | 9/2015 | Signore et al. | |
| 9,719,492 B2 | 8/2017 | Pasquet et al. | |
| 11,673,216 B2 * | 6/2023 | Løvlund Toft | F16H 55/17 29/402.09 |
| 2011/0142617 A1 * | 6/2011 | Mashue | F03D 15/10 29/889.1 |
| 2014/0308131 A1 * | 10/2014 | Pasquet | F03D 80/70 416/155 |
| 2020/0331103 A1 * | 10/2020 | Løvlund Toft | F16H 55/17 |

* cited by examiner

*Primary Examiner* — Sean Gugger
(74) *Attorney, Agent, or Firm* — Tarolli, Sundheim, Covell &Tummino LLP

(57) ABSTRACT

A repair device is provided for a wind turbine having a bearing with damaged teeth driven by a motor. The repair device includes a carrier for connection to the bearing and radially aligned with the damaged teeth. A gear train is mounted on the carrier for creating a torque transfer path from the motor to non-damaged teeth of the bearing.

19 Claims, 8 Drawing Sheets

WIND TURBINE OFFSET PITCH DRIVE PINION

TECHNICAL FIELD

The present invention relates generally to wind turbines, and specifically to a repair device for addressing bearing wear in a wind turbine.

BACKGROUND

A wind turbine typically includes a plurality of blades connected to a nacelle through a rotor hub and a control mechanism to control the pitch of the blades. The wind turbines adjust rotor blade pitch for several reasons, namely, to improve the wind turbine efficiency by adapting the blade aerodynamics with wind speed changes. Another reason is to take the blades to an unloaded or feathered condition in the event that wind speed exceeds the maximum safe rated speed or in the event of fault conditions.

To perform the pitch, each blade is provided with a bearing between the hub and the blade, and some sort of mechanism to provide the force for pitching the blade and maintaining it in a given position. This pitching arrangement enables each blade to be turned approximately 120° around its rotational axis.

SUMMARY

In one example, a repair device is provided for a wind turbine having a bearing with damaged teeth driven by a motor. The repair device includes a carrier for connection to the bearing and radially aligned with the damaged teeth. A gear train is mounted on the carrier for creating a torque transfer path from the motor to non-damaged teeth of the bearing.

In another example, a repair device is provided for a wind turbine having a bearing with damaged teeth driven by a motor. The repair device includes a carrier for connection to the bearing and radially aligned with the damaged teeth. A gear train is mounted on the carrier and includes a drive gear configured to receive torque from the motor. A pair of idler gears is positioned on opposite sides of the drive gear and configured to mesh with the drive gear. A pair of pinion gears is meshed with the respective idler gears and with non-damaged teeth of an inner ring of the bearing for delivering torque from the drive gear to the non-damaged teeth of the bearing.

In another example, a method is provided for installing a repair device on a wind turbine having a bearing with damaged teeth driven by a motor. The method includes providing the repair device including a gear train mounted on a carrier. The repair device is radially aligned with the damaged teeth on the bearing. The carrier is connected to the bearing such that the gear train creates a torque transfer path from the motor to non-damaged teeth of the bearing.

Other objects and advantages and a fuller understanding of the invention will be had from the following detailed description and the accompanying drawings.

DETAILED DESCRIPTION

The present invention relates generally to wind turbines, and specifically to a repair device for addressing bearing wear in a wind turbine. The wind turbine bearing to be repaired by the present invention can be, for example, a pitch bearing, a yaw bearing and/or a drive bearing. The present disclosure offers a distinct technical advantage by offering an easy, inexpensive means of re-establishing functional torque transfer between the drive motor and the toothed inner ring of the bearing when one or more teeth become damaged. To this end, a carrier is provided with a gear train including a series of gears coupled to the drive motor and arranged to circumferentially span the damaged teeth on the bearing and engage teeth that are not/less damaged, thereby maintaining functional torque transfer to the bearing.

Figure 1:
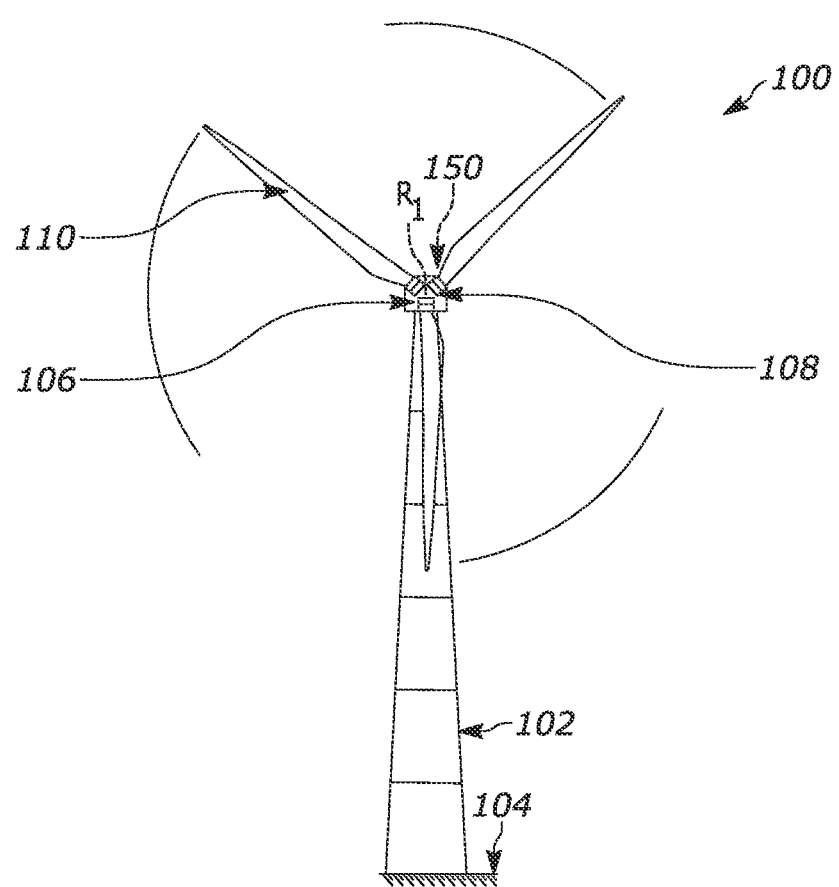
FIG. 1 is a perspective view of an example wind turbine in an aspect of the present invention.

FIG. 1 illustrates an example wind turbine 100 having a bearing repair device 150 installed therein in accordance with an aspect of the present invention. The wind turbine 100 can be an offshore wind turbine or an onshore wind turbine. The wind turbine 100 includes a tower 102 extending vertically from a foundation 104 or base 104 on land or off-shore. A nacelle 106 is mounted at the upper end of the tower 102. A rotor hub 108 is mounted at the front end of the nacelle 106 and is rotatable about an axis $R_1$ relative to the nacelle in a generally vertical plane. Turbine blades 110 extend radially from the hub 108 and rotate with the hub in response to wind impinging upon the blades.

Figure 2:
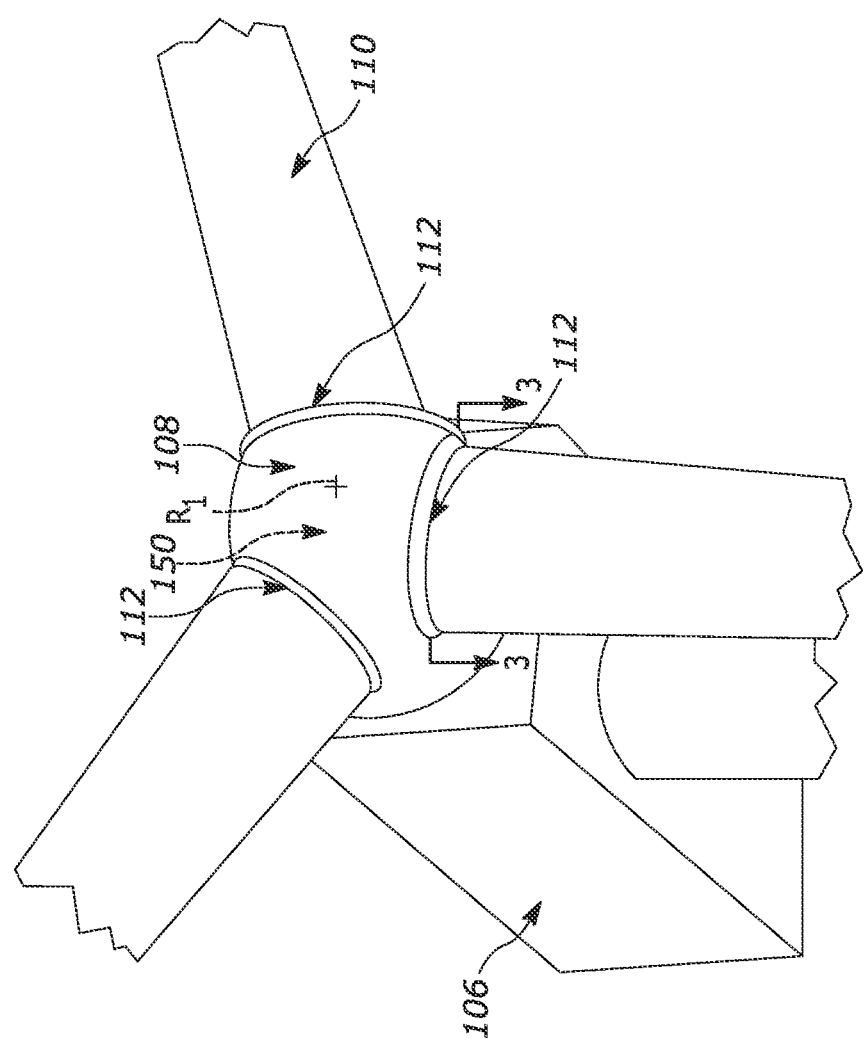
FIG. 2 is an enlarged view of a portion of the wind turbine of FIG. 1.

Referring to FIG. 2, each of the blades 110 is connected to the hub 108 through a respective pitch bearing 112. Each bearing 112 is configured to rotate its corresponding blade 110 between different pitch angles relative to an axis $R_2$. The bearing 112 includes concentric inner and outer rings 114, 116. The outer ring 116 is fixed to the hub 108. The inner ring 114 is fixed to the blade 110 and rotatably coupled to the outer ring 116. To this end, a series of rolling elements (not shown) are provided between and interface with the rings 114, 116 to facilitate smooth relative rotation between the rings about the axis $R_2$. In one example, the rolling elements can be formed as spherical balls made of steel and/or other suitable materials. These rolling elements can be selectively hardened to provide long operating life and smooth rotation between inner and outer rings 114, 116. Lubrication can also be provided between the rings 114, 116 to reduce friction therebetween during operation.

Figure 3:
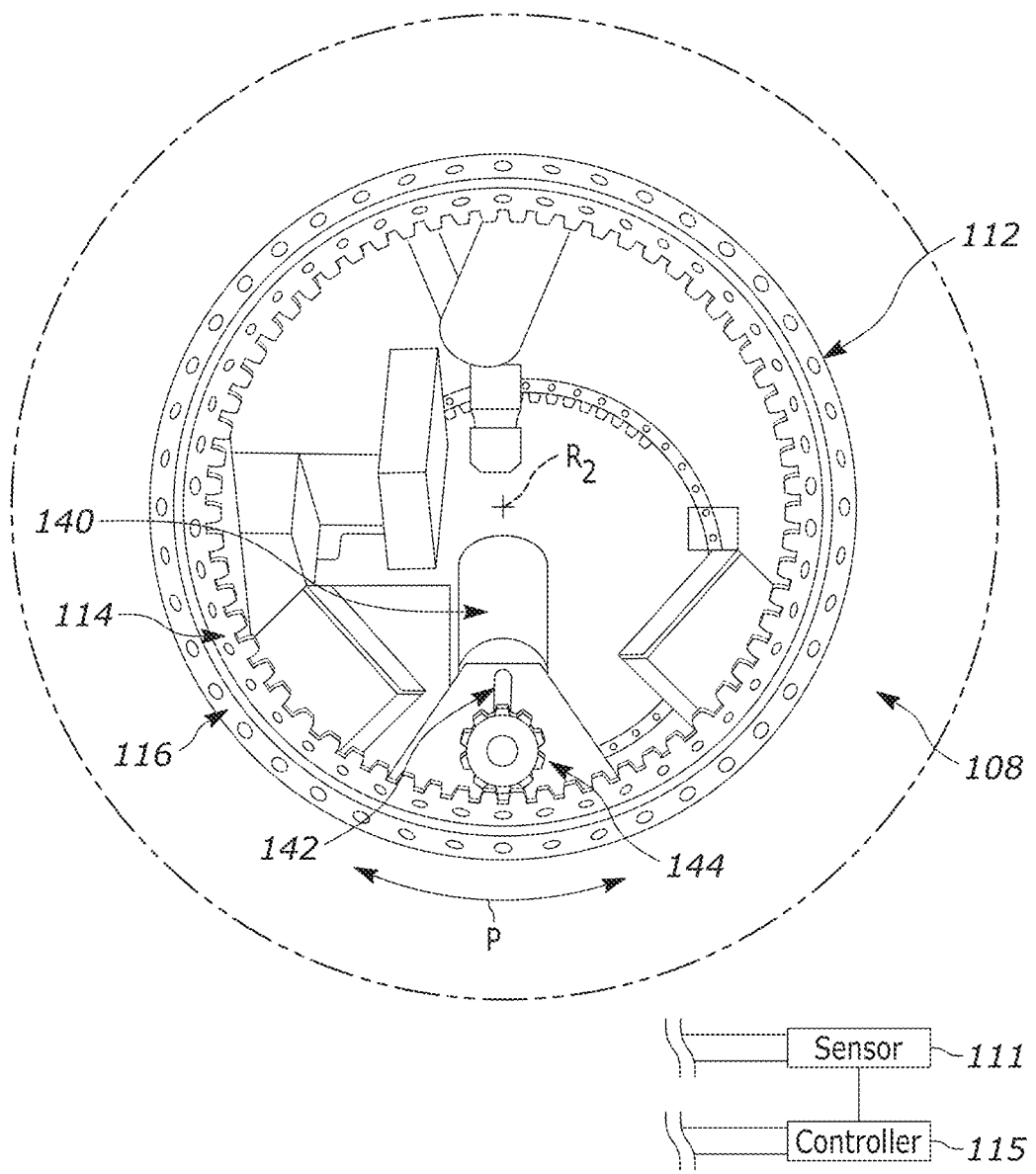
FIG. 3 is a section view of FIG. 2 taken along line 3-3.
Figure 4:
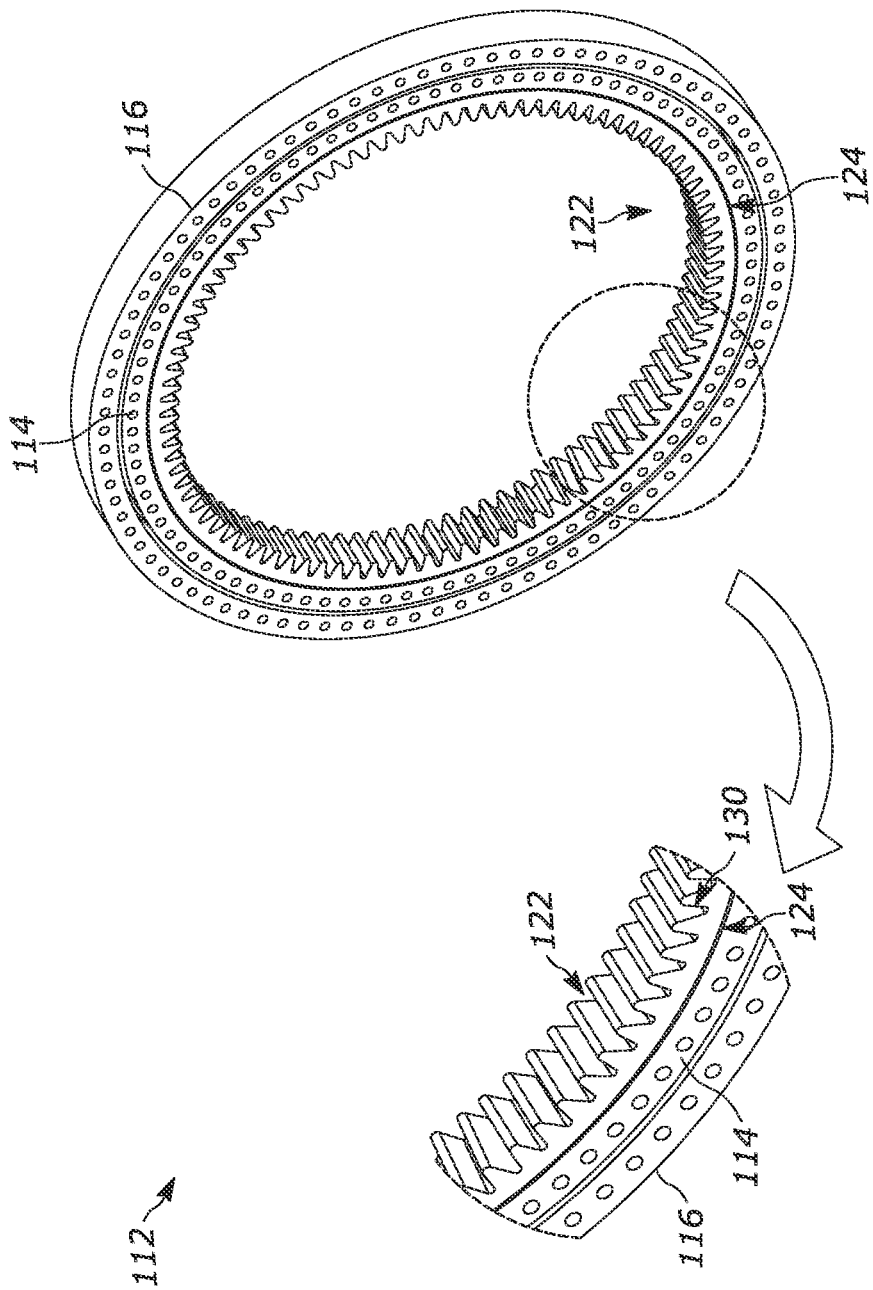
FIG. 4 is a perspective and enlarged view of a bearing of the wind turbine.

Turning to FIG. 3, a gear ring 118 is provided on the inner ring 114. The gear ring 118 can be integrally formed with the inner ring 114 or secured thereto with fasteners, welding, etc. It will be appreciated that the gear ring 118 can completely encircle the rotation axis $R_2$ (as shown) or extend less than 360° around the axis (not shown). In any case, the gear ring 118 has a radially inner side 122 and a radially outer side 124 (see also FIG. 4). Teeth 130 extend from the radially inner side 122 towards the axis $R_2$. The radially outer side 124 abuts the inner ring 114.

A motor 140 is provided within the hub 108 and includes a shaft 142 bearing an output gear 144 rotatable with the shaft 142. The output gear 144 is meshed with the teeth 130 on the gear ring 118 such that rotation of the motor 140 drives the output gear 144 which, in turn, rotates the inner ring 114 relative to the outer ring about the axis $R_2$. More specifically, rotating the output gear 144 causes the gear ring 118 to move along a circumferential path P, thereby rotating the inner ring 114 secured thereto and changing the pitch of the blade 110 associated with that particular bearing 112.

One or more sensors 111 can be provided on the nacelle 106 for monitoring wind speed and/or wind direction during operation of the wind turbine 100. A controller 115 is connected to the sensors 111 and the motor 140. The motor 140, in response to signals sent by the sensors 111 indicative of the wind speed and/or wind direction, can be operated by the controller 115 to adjust the pitch angle(s) of the blade(s) 110 during operation of the wind turbine 110 to help maximize its efficiency.

It will be appreciated that a separate motor 140 and gear ring 118 is associated with each blade 110 such that the pitch angle of each blade can be individually adjusted. The same controller 115 and sensors 111 can be used to individually control each motor 140. With this in mind, the circumferential or arcuate extent of any particular gear ring 118 dictates the degree to which the blade 110 associated therewith can change its pitch because the blade is coupled to the inner ring 114 on which the gear ring resides. As shown, the gear ring 118 is a ring and, thus, the blade 110 connected thereto can rotate completely about its axis $R_2$. It will be appreciated that each gear ring 118 can extend over the same arcuate angle as any other gear ring or a different arcuate angle.

Figure 5:
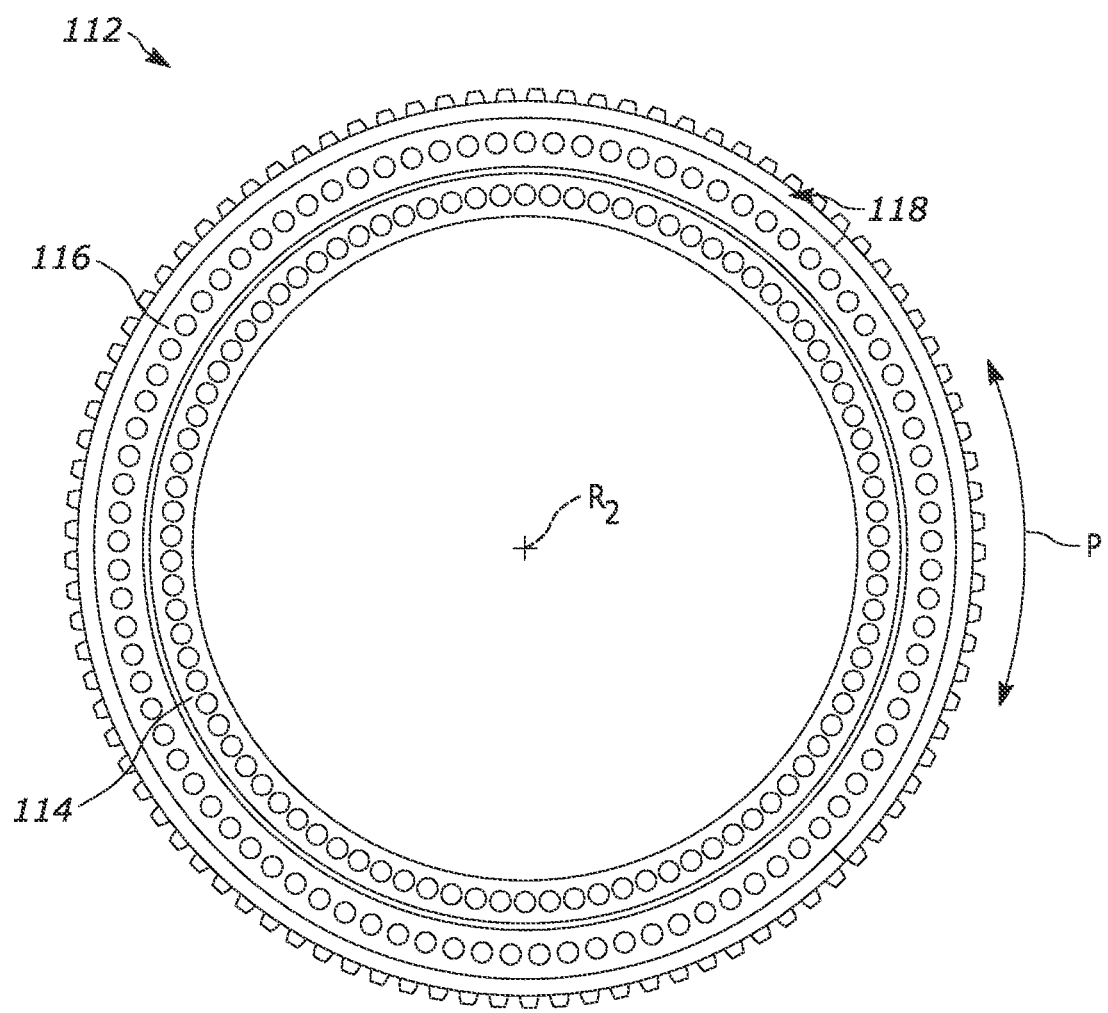
FIG. 5 is a side view of an alternative bearing.

It will also be appreciated that the gear ring 118 can also be provided on the radially outer side of the outer bearing 116, as shown in FIG. 5. In this configuration, the teeth 130 extend radially outward from the outer ring 116 relative to the axis $R_2$. The motor 140, shaft 142, and output gear 144 (not shown) are then positioned relative to the hub 108 to enable the output gear to mesh with the teeth 130 on the outer ring 116. In this configuration, the blade 110 is secured to the outer ring 116 and movable therewith in response to rotation of the output gear 144. The motor 140 can rotate the outer ring 116 relative to the inner ring 114 and about the axis $R_2$ to adjust the pitch of the blade 110 secured to that particular outer ring. The same configuration can be utilized for the remaining bearings 112.

In either configuration, it will be appreciate that over time, one or more of the teeth 130 on the inner bearing ring 114 can become damaged, e.g., worn, chipped, cracked, corroded, etc. As a result, the interface between the motor output gear 144 and the teeth 130 can become compromised. With this in mind, the present invention provides a repair device 150 for maintaining or reestablishing a reliable, torque transferring connection between the output gear 144 and the teeth 130.

Figure 6:
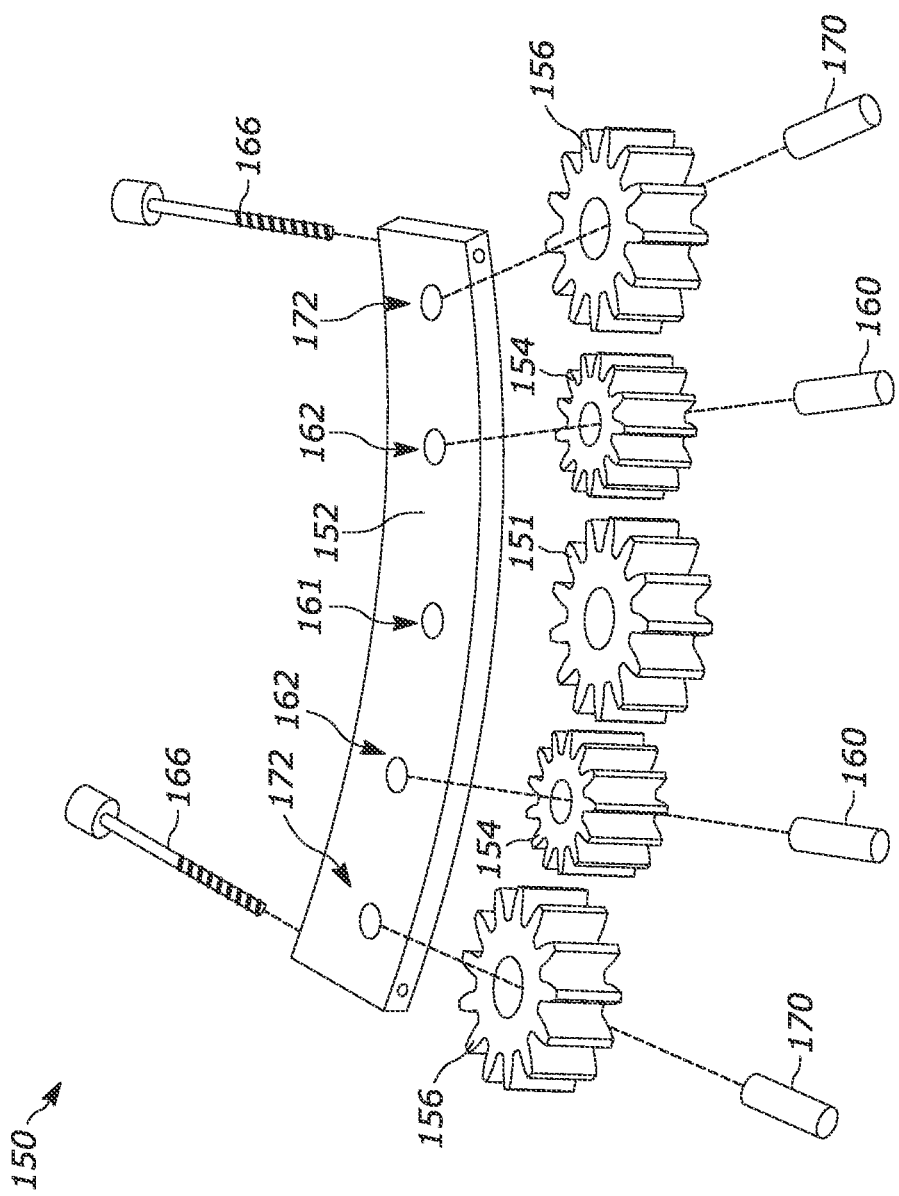
FIG. 6 is an exploded view of an example bearing repair device in accordance with an aspect of the invention.
Figure 7:
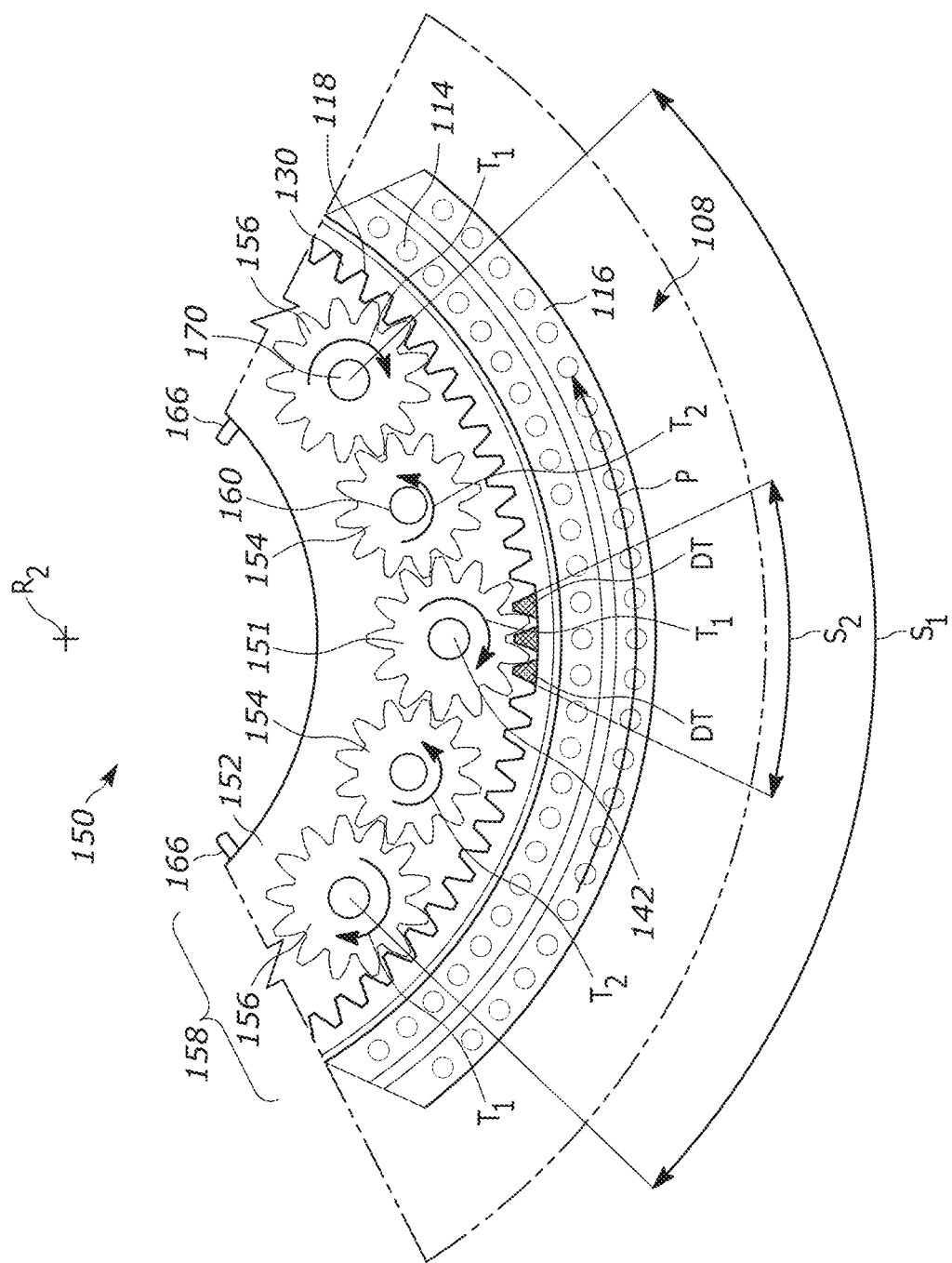
FIG. 7 is a schematic illustration of the bearing repair device installed on the wind turbine.

Turning to FIGS. 6-7, the repair device 150 includes a carrier or base 152 connected directly or indirectly to the bearing 112. As shown, fasteners 166 rigidly fix the carrier 152 to the hub 108 [thereby indirectly connecting the repair device 150 to the bearing 112] such that the repair device 150 is radially aligned with the damaged teeth (indicated as "DT"). Alternatively, the fasteners 166 can connect the carrier 152 directly to the outer ring 116 (not shown) to radially align the repair device 150 with the damaged teeth.

A drive gear 151, at least one idler gear 154, and at least one pinion gear 156 are provided on the carrier 152 and collectively form a gear train 158. The gear train 158 can include multiple of each gear 154, 156 (as shown) or one of each gear (not shown). Regardless, the number of idler gears 154 and the number of pinion gears 156 is the same. The idler gears 154 can be the same size as the pinion gears 156 or a different size, i.e., smaller or larger diameters. As shown, the drive gear 151 is the same size as the pinion gear(s) 156. In an alternative construction, the idler gear(s) 154 are omitted and a drive chain (not shown) connects the drive gear 151 to the at least one pinion gear 156. Consequently, the gear train in such constructions includes the drive gear 151, the drive chain, and at least one pinion gear 156.

The drive gear 151 is intended to replace the output gear 144 of the motor 140. Consequently, the drive gear 151 is configured to be attached to the shaft 142, which extends through an opening 161 in the carrier 152, and receive torque from the motor 140. That said, the drive gear 151 can be the same size as the output gear 144 it replaces or smaller than the output gear.

The idler gears 154 are rotatably supported on axles 160 extending through openings 162 in the carrier 152. The pinion gears 156 are rotatably supported on axles 170 extending through openings 172 in the carrier 152. As shown, the openings 162 are circumferentially aligned with one another and the openings 161, 172 are circumferentially aligned with one another. The openings 162 are radially offset from the openings 161, 172. Other positions and orientations are contemplated for the openings 162 and/or the openings 161, 172. Regardless, the gear train 158 has a generally concave contour or centerline, i.e., a centerline extending through all the openings 161, 172, to accommodate the contour of the [inwardly extending] teeth 130 on the inner ring 114.

Once the output gear 144 is removed and the drive gear 151 connected to the shaft 142, the idler gears 154 are meshed with the drive gear 151 and radially spaced from the teeth 130. It will be appreciated that the drive gear 151 can engage the damaged teeth DT (as shown) or be spaced therefrom (not shown). Regardless, the pinion gears 156 are meshed with both the idler gears 154 as well as with the teeth 130.

As a result, torque delivered to the drive gear 151 from the motor 140 is transferred circumferentially outward to both idler gears 154, then to both pinion gears 156, and ultimately to the teeth 130. This torque transfer is illustrated schematically at $T_1$ and $T_2$ in FIG. 7, with $T_1$ representing clockwise torque and $T_2$ representing counterclockwise torque when the drive gear 151 rotates in the clockwise direction. It will be appreciated that all the torque directions shown will be reversed when the drive gear 151 rotates in the counterclockwise direction (not shown). In each case, any pinion gear 156 in the gear train 158 rotates in the same direction as the drive gear 151 and any idler gear 154 rotates in the opposite direction. That said, the sizing of the gears 154, 156 and/or positioning of the openings 162 and/or openings 172 ensures that only the gears 151, 156 engage the teeth 130. The idler gears 154 rotate in the opposite direction from the gears 151, 156 and therefore are spaced from the teeth 130.

The size of each gear 151, 154, 156 and the size and number of each gear 154, 156 in the gear train 158 is selected such that the arc length of the gear train 158 (indicated at $s_1$) is greater than the arc length of the worn/damaged teeth DT (indicated at $s_2$). In one example, the arc length $s_1$ of the gear train 158 is less than 90°, e.g., about 30° to about 45°. The arc length $s_1$ of the gear train 158 can be measured between the axles 170 of the outermost pinion gears 156 (as shown) or between the outermost teeth of said pinion gears (not shown). In any case, the gear train 158 is sized to circumferentially span the entirety of the damaged teeth DT on the inner ring 114 such that the pinion gears 156 (or at least one pinion gear) is always engaged with non-damaged teeth 130 as the pitch of the blade 110 is adjusted. In this manner, the repair device 150 provides a torque transfer path from the motor 140 and around the damaged teeth DT to non-damaged teeth 130, thereby allowing the bearing 112 to maintain functionality without requiring replacement of the teeth, removal of the inner ring 114 or the so called "dentures" to be applied to the damaged teeth DT.

It will be appreciated that the repair device 150 can also be adapted to transfer torque between the motor 140 and non-damaged teeth 130 when the bearing 112 has the configuration shown in FIG. 5. To this end, the carrier 152 and openings 161, 162, 172 can be arranged to orient the gear train 158 to extend generally along a convex contour or centerline to accommodate the [outwardly extending] teeth 130 on the outer ring 116. As with the earlier described configuration, the carrier 152 used with the bearing 112 of FIG. 5 can either be directly connected to the bearing 112 (in this case directly connected to the inner ring 114) or indirectly connected to the bearing by being secured to the hub 108.

It will also be appreciated that in either configuration of the bearing 112 the output gear 144 can be retained and the gear train 158 adapted to receive torque therefrom. In this example, the drive gear 151 is omitted and the gear train 158 is provided with only idler gears 154 and pinion gears 156 arranged on opposite sides of the output gear 144 for delivering torque from the motor 140 to non-damaged teeth 130. The repair device 150 is then installed such that the idler gears 154 on either side of the output gear 144 are meshed therewith to allow for torque transfer from the output gear to the idler gears.

Although the repair device 150 is shown in use with the pitch bearing 112 one having ordinary skill in the art will readily understand that any bearing in the wind turbine 100 can be repaired with the repair device, such as but not limited to the yaw bearing and/or drive bearing in accordance with the present invention. To this end, the repair device 150 can be modified by adjusting its size, shape, contour, number of gears, toothing, etc. to accommodate the particular bearing to be repaired.

Figure 8:
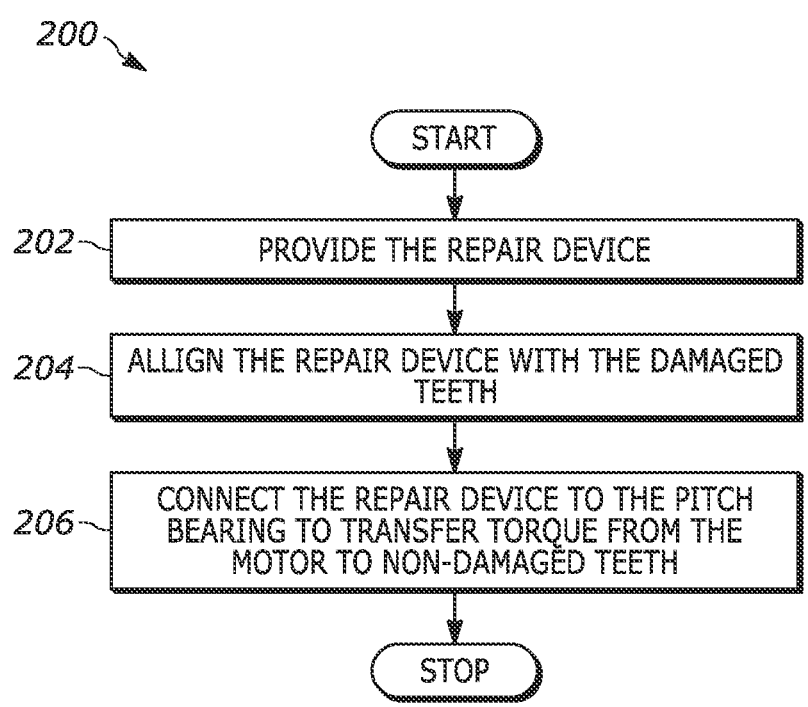
FIG. 8 is a flow chart illustrating the steps of installing the repair device on a damaged bearing.

FIG. 8 is a flow chart 200 illustrating the steps of installing the repair device 150 on the bearing 112 of a wind turbine 100. At step 202, the repair device 150 is provided at the wind turbine 100. This occurs whether the output gear 144 is removed or retained. At step 204, the repair device 150 is radially aligned with the damaged teeth DT on the bearing 112. The repair device 150 can be positioned radially within the bearing 112 (for the bearing shown in FIG. 3) or radially outward of the bearing (for the bearing shown in FIG. 5). At step 206, fasteners 166 [directly or indirectly] connect the carrier 152 to the bearing 112 to fix the gear train 158 in place such that the pinions 156 engage teeth 130 on opposing circumferential sides of the damaged teeth DT to create a reliable torque transfer path from the drive gear 151, through the idler gears 154, through the pinion gears 156, and to the teeth 130 When the gear train 158 omits the drive gear 151 and the output gear 144 is retained, the drive train creates a reliable torque transfer path from the output gear 144, through the idler gears 154, through the pinion gears 156, and to the teeth 130. In both scenarios, the repair device 150 allows the motor 140 to reliably and repeatably adjust the pitch of the previously affected blade 110.

The repair device of the present invention is advantageous in that it provides an efficient, less expensive means of addressing damaged bearing teeth than current solutions. To this end, providing a repair device that can be readily adapted to the tooth issue faced in a particular bearing and that can be readily installed thereon with minimal effort alleviates the need to remove the bearing, remove the problematic teeth altogether or apply expensive and time consuming "dentures" to the damaged teeth. All the currently existing components within the hub can be maintained in their current positions while the repair device is simply secured in position in the appropriate location to enable the gear train to temporarily or permanently drive non-damaged teeth to adjust the blade pitch angle. It will be appreciated that the same repair device can be moved to another location where additional teeth on the bearing become damaged or another, different repair device can be constructed and installed.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A repair device for a wind turbine having a hub and a bearing with damaged teeth driven by a motor, comprising:
   a carrier plate for connection to the bearing and radially aligned with the damaged teeth; and
   a gear train mounted along the length of the carrier plate for creating a torque transfer path from the motor to non-damaged teeth of the bearing, wherein the carrier plate and the gear train are separate from the bearing and the hub and attached to the hub with fasteners.

2. The repair device of claim 1, wherein the gear train receives torque from the motor and is meshed with the non-damaged teeth for delivering torque from the motor to the non-damaged teeth.

3. The repair device of claim 1, wherein the gear train comprises:
   a drive gear configured to receive torque from the motor;
   at least one idler gear configured to mesh with the drive gear; and
   at least one pinion gear meshed with the at least one idler gear and the non-damaged teeth of the bearing for delivering torque from the drive gear to the non-damaged teeth.

4. The repair device of claim 1, wherein the gear train extends only to one side of the drive gear.

5. The repair device of claim 1, wherein the gear train extends to opposite sides of the drive gear.

6. The repair device of claim 1, wherein the gear train comprises:
   a drive gear configured to receive torque from the motor;
   a pair of idler gears positioned on opposite sides of the drive gear and configured to mesh with the drive gear; and
   a pair of pinion gears meshed with the respective idler gears and with the non-damaged teeth of the bearing for delivering torque from the drive gear to the non-damaged teeth.

7. The repair device of claim 1, wherein the gear train has an arc length of less than 90°.

8. The repair device of claim 1, wherein the gear train has an arc length of about 30° to about 45°.

9. The repair device of claim 1, wherein the gear train has a concave centerline for transferring torque to the non-damaged teeth on an inner ring of the bearing.

10. The repair device of claim 1, wherein the gear train has a convex centerline for transferring torque to the non-damaged teeth on an outer ring of the bearing.

11. The repair device of claim 1, wherein the bearing is one of a pitch bearing, a drive bearing, and a yaw bearing on the wind turbine.

12. A repair device for a wind turbine having a hub and a bearing with damaged teeth driven by an output gear of a motor, comprising:
   a carrier plate for connection to the bearing and radially aligned with the damaged teeth; and
   a gear train mounted along the length of the carrier plate and extending along a concave centerline, comprising:
   a drive gear configured to receive torque from the motor;
   a pair of idler gears positioned on opposite sides of the drive gear and configured to mesh with the drive gear; and
   a pair of pinion gears meshed with the respective idler gears and with non-damaged teeth of an inner ring of the bearing for delivering torque from the drive gear to the non-damaged teeth of the bearing, wherein the carrier plate and the gear train are separate from the bearing and the hub and attached to the hub with fasteners.

13. The repair device of claim 12, wherein the gear train has an arc length of less than 90°.

14. The repair device of claim 12, wherein the gear train has an arc length of about 30° to about 45°.

15. A method of installing a repair device on a wind turbine having a hub and a bearing with damaged teeth driven by an output gear of a motor, the method comprising:
   providing the repair device comprising a gear train mounted along the length of a carrier plate separate from the bearing and the hub;
   removing the output gear;
   radially aligning the repair device with the damaged teeth on the bearing; and
   connecting the separate carrier plate to the hub with fasteners such that the gear train is coupled to the motor and creates a torque transfer path from the motor to non-damaged teeth of the bearing.

16. The method of claim 15, wherein the step of radially aligning the repair device comprises positioning the gear train radially inward of an inner ring of the bearing having the damaged teeth.

17. The method of claim 15, wherein the step of radially aligning the repair device comprises positioning the gear train radially outward of an outer ring of the bearing having the damaged teeth.

18. The method of claim 15, wherein the damaged teeth are on one of a pitch bearing, a drive bearing, and a yaw bearing on the wind turbine.

19. The method of claim 15, wherein the carrier plate is connected to the hub after the teeth are damaged on the bearing.

* * * * *